W. P. PORTER.
PNEUMATIC VALVE.
APPLICATION FILED MAR. 6, 1914.
1,247,326.
Patented Nov. 20, 1917.
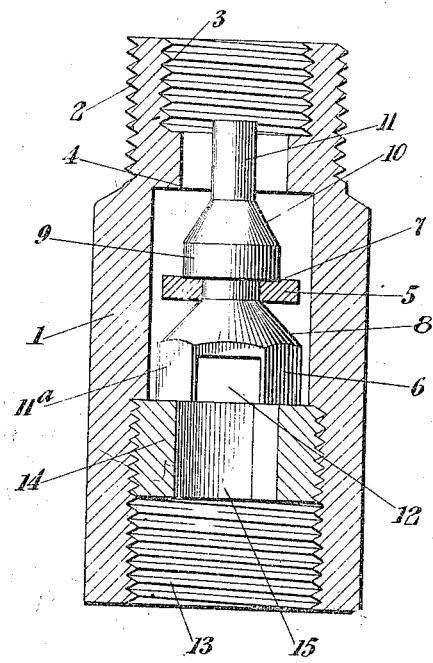
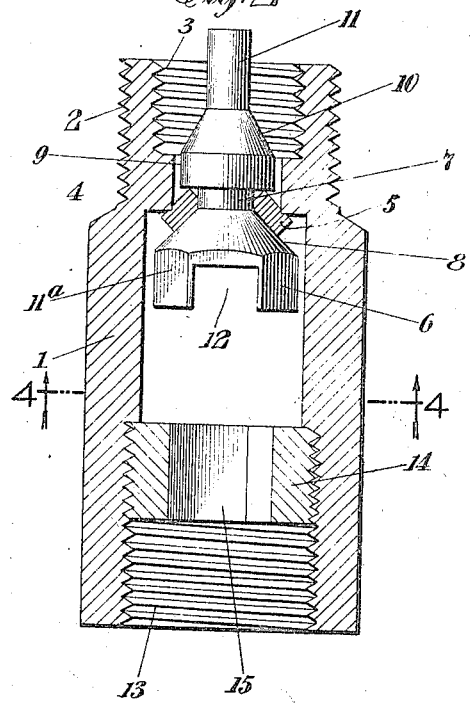
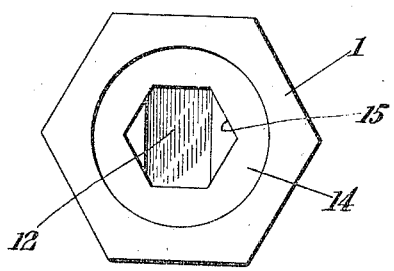
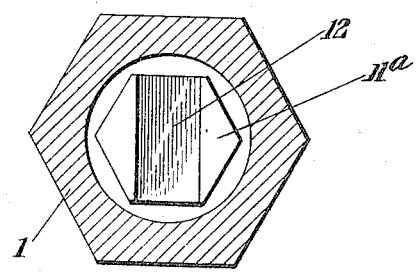
Witnesses:
Inventor
Winfield P. Porter
By his Attorneys

UNITED STATES PATENT OFFICE.

WINFIELD P. PORTER, OF NEW YORK, N. Y.

PNEUMATIC VALVE.

1,247,326.

Specification of Letters Patent.

Patented Nov. 20, 1917.

Application filed March 6, 1914. Serial No. 822,733.

*To all whom it may concern:*

Be it known that I, WINFIELD P. PORTER, of New York city, in the county of New York and in the State of New York, have invented a certain new and useful Improvement in Pneumatic Valves, and do hereby declare that the following is a full, clear, and exact description thereof.

My invention relates particularly to air valves which are adapted to be applied to pneumatic tires. The object of my invention is to provide an air valve for pneumatic tires, which is exceedingly efficient in its operation, which is not provided with parts which may readily get out of order, and which is exceedingly simple in construction. Further objects of my invention are to provide an air valve of this character in which the washer used in the valve is supported in such a manner that it may freely adjust itself to a seat and more particularly an angularly shaped seat prior to the final closing of the valve, and in which, furthermore, the valve is constructed in such a manner that while air is being pumped into a tire the opening available for the passage of air is very much enlarged during the introduction of air.

While my invention is capable of embodiment in many different forms, for the purpose of illustration, I have shown only one form thereof in the accompanying drawings, in which, Figure 1 is a longitudinal section of my device showing the valve in open position, Fig. 2 is a similar view showing the valve in closed position, Fig. 3 is a bottom plan view thereof, and, Fig. 4 is a transverse section on the line 4—4 of Fig. 2.

In the drawings I have shown an outer casing 1 having on its upper end an outer screw-threaded portion 2 for connection with automobile pumps and motorcycle pumps and upon its interior a screw-thread 3 for connection with bicycle pumps. Near the central portion of the casing 1 there is a shoulder 4 which forms an angular seat for the rubber washer 5 carried upon a plunger 6 which constitutes the movable portion of the valve. This plunger 6 has a central reduced portion 7 upon which the rubber washer 5 is carried. Said washer 5 prior to the closing of the valve may be normally supported away from a conical surface 8, which forms a seat for said washer when in closed position. When in open position, however, the washer 5 may be normally supported away from the conical surface 8. Above the reduced portion 7, the plunger 6 has a cylindrical guiding surface 9, and above this cylindrical portion 9 there is a conical surface 10 for purposes to be hereinafter described. Beyond the conical surface 10 the plunger 6 is extended so as to form a central rod 11 which acts also as a guide in the manner to be hereinafter described. At its lower end the plunger 6 has a polygonal body portion 11 and a transverse recess 12 to permit the air to readily pass by the body portion and into the tire during its inflation. The lower end of the casing 1 has an internal screw thread 13 into which a fiber block 14 is adapted to be screwed, said fiber block 14 having a central polygonal opening 15 to permit the block to be screwed in and out by means of a tool.

In the operation of the valve while air is being pumped into the tire through the valve the extreme upper end 11 of the plunger 6 will be opposite the angular seat 4 thereby producing a large opening between the plunger 6 and the valve seat while air is being pumped into the tire. At the same time, air will readily pass the polygonal sides of the main body portion 11 and through the transverse opening 12 into the tire by means of the passageway 15 in the fiber washer 14. When the air pump is detached the air pressure in the tire will immediately force the plunger 6 upwardly. Prior to the seating of the washer 5 upon the conical surface 8, said washer 5 will have had an opportunity to adjust itself to the angular seat 4 after which the washer 5 will become firmly seated against the conical surface 8 thereby tightly closing the valve and preventing the escape of any air. In the upward movement of the plunger 6 to seat the valve the forward end 11 will prevent the valve from lodging against the valve seat 4 and the conical surface 10 will guide the plunger 6 into its central position prior to the time when the washer 5 contacts with the angular seat 4. The positioning of the washer 5 upon the angular seat 4 will also be assisted by the cylindrical surface 9, inasmuch as said surface will prevent any material tilting of the plunger 6 while the washer 5 is being adjusted to the angular seat 4 in the closing operation. At the beginning of the inflation of the tire the conical surface 10 will also permit the rapid entry of air through the valve past the valve seat 4. The fiber block 14 limits the downward movement of the plunger 6 so as to prevent the upper end of the forward portion 11 from passing below the level of the angular seat 4.

While I have described my invention above in detail I wish it to be understood that many changes may be made therein without departing from the spirit of my invention.

I claim:—

1. In a valve, the combination of a casing having a valve seat, a plunger having a seat and a washer supported on the plunger away from said seat thereon when the valve is open and against said seat thereon when closed.

2. In a valve, the combination of a casing having a valve seat, a plunger having a conical seat and a washer supported on the plunger away from said seat thereon when the valve is open and against said conical seat thereon when closed.

3. In a valve, the combination of a casing having an angular valve seat, a plunger having a conical seat and a washer supported on the plunger away from said seat thereon when the valve is open and against said conical seat thereon when closed.

In testimony that I claim the foregoing I have hereunto set my hand.

WINFIELD P. PORTER.

Witnesses:
 ARTHUR WRIGHT,
 L. BRODERICK.